(12) United States Patent
Ohsawa

(10) Patent No.: US 10,754,378 B2
(45) Date of Patent: Aug. 25, 2020

(54) TOUCH SENSOR AND BRACELET-TYPE DEVICE

(71) Applicant: POLYMATECH JAPAN CO., LTD., Saitama, Saitama (JP)

(72) Inventor: Yuta Ohsawa, Saitama (JP)

(73) Assignee: SEKISUI POLYMATECH CO., LTD., Saitama (JP)

( * ) Notice: Subject to any disclaimer, the term of this patent is extended or adjusted under 35 U.S.C. 154(b) by 0 days.

(21) Appl. No.: 15/304,723

(22) PCT Filed: Apr. 24, 2015

(86) PCT No.: PCT/JP2015/062535
§ 371 (c)(1),
(2) Date: Oct. 17, 2016

(87) PCT Pub. No.: WO2015/166888
PCT Pub. Date: Nov. 5, 2015

(65) Prior Publication Data
US 2017/0038797 A1 Feb. 9, 2017

(30) Foreign Application Priority Data

Apr. 28, 2014 (JP) .................. 2014-092322

(51) Int. Cl.
*G06F 3/044* (2006.01)
*G06F 1/16* (2006.01)
*G06F 3/041* (2006.01)

(52) U.S. Cl.
CPC ............ *G06F 1/163* (2013.01); *G06F 1/1656* (2013.01); *G06F 1/1684* (2013.01); *G06F 3/044* (2013.01);
(Continued)

(58) Field of Classification Search
CPC ...... G06F 3/0412; G06F 1/163; G06F 1/1684; G06F 1/1656; G06F 3/0416; G06F 3/044; G06F 2203/04107
See application file for complete search history.

(56) References Cited

U.S. PATENT DOCUMENTS 8,587,533 B2 * 11/2013 Nishihara ............. G06F 3/0416
345/173
9,011,292 B2 * 4/2015 Weast ................. G06F 19/3481
482/1
(Continued)

FOREIGN PATENT DOCUMENTS

CN 102298473 A 12/2011
CN 103221902 A 7/2013
(Continued)

OTHER PUBLICATIONS

International Search Report for PCT Patent App. No. PCT/JP2015/062535 (dated Jul. 7, 2015).
(Continued)

*Primary Examiner* — Jeff Piziali
(74) *Attorney, Agent, or Firm* — Cermak Nakajima & McGowan LLP; Tomoko Nakajima

(57) ABSTRACT

A touch sensor includes a sensor electrode layer having a plurality of sensor electrodes, a front surface protective layer disposed on an operation surface side, and a back surface protective layer disposed on an opposite side of the operation surface, the front surface protective layer and the back surface protective layer being stacked together. In the touch sensor, the back surface protective layer includes a suppressing member configured to prevent easy detection of a change in capacitance from the opposite side of the operation surface.

9 Claims, 4 Drawing Sheets

(52) U.S. Cl.
CPC .......... *G06F 3/0412* (2013.01); *G06F 3/0416* (2013.01); *G06F 2203/04107* (2013.01)

(56) References Cited

U.S. PATENT DOCUMENTS

| | | | |
|---|---|---|---|
| 9,069,424 B2* | 6/2015 | Nagata | G06F 3/044 |
| 9,076,402 B2* | 7/2015 | Yamanaka | G09G 3/3655 |
| 9,081,542 B2* | 7/2015 | Dickinson | G06F 3/0412 |
| 9,482,693 B2* | 11/2016 | Nishizawa | G06F 3/044 |
| 2009/0251419 A1* | 10/2009 | Radely-Smith | A44C 5/0007 345/169 |
| 2010/0029327 A1* | 2/2010 | Jee | G04G 17/045 455/556.1 |
| 2010/0214261 A1 | 8/2010 | Yamanaka et al. | |
| 2010/0219943 A1* | 9/2010 | Vanska | G06F 1/163 340/407.1 |
| 2010/0220071 A1 | 9/2010 | Nishihara et al. | |
| 2010/0317409 A1* | 12/2010 | Jiang | G06F 1/1626 455/566 |
| 2011/0316809 A1 | 12/2011 | Kim et al. | |
| 2012/0075196 A1 | 3/2012 | Ashbrook et al. | |
| 2012/0092383 A1* | 4/2012 | Hysek | G04G 9/00 345/684 |
| 2012/0127070 A1* | 5/2012 | Ryoo | G06F 3/014 345/156 |
| 2013/0027333 A1 | 1/2013 | Nagata | |
| 2013/0044215 A1* | 2/2013 | Rothkopf | G06F 1/163 348/143 |
| 2013/0106684 A1 | 5/2013 | Weast et al. | |
| 2013/0181727 A1 | 7/2013 | Nishizawa et al. | |
| 2014/0028569 A1* | 1/2014 | Guard | G06F 3/044 345/173 |
| 2014/0062892 A1* | 3/2014 | Dickinson | G06F 3/0412 345/173 |
| 2015/0309536 A1* | 10/2015 | Dickinson | G06F 3/0412 345/173 |

FOREIGN PATENT DOCUMENTS

| | | |
|---|---|---|
| CN | 103238130 A | 8/2013 |
| JP | 2010-197570 A | 9/2010 |
| JP | 2010-218542 A | 9/2010 |
| JP | 2012-178149 A | 9/2012 |
| JP | 2013-003758 A | 1/2013 |
| JP | 2013-029950 A | 2/2013 |
| JP | 2013-146557 A | 8/2013 |
| JP | 2013-541095 A | 11/2013 |
| WO | WO2014/035680 A2 | 3/2014 |

OTHER PUBLICATIONS

Office Action from Chinese Patent App. No. 201580022474.9 (dated Oct. 10, 2018).

* cited by examiner

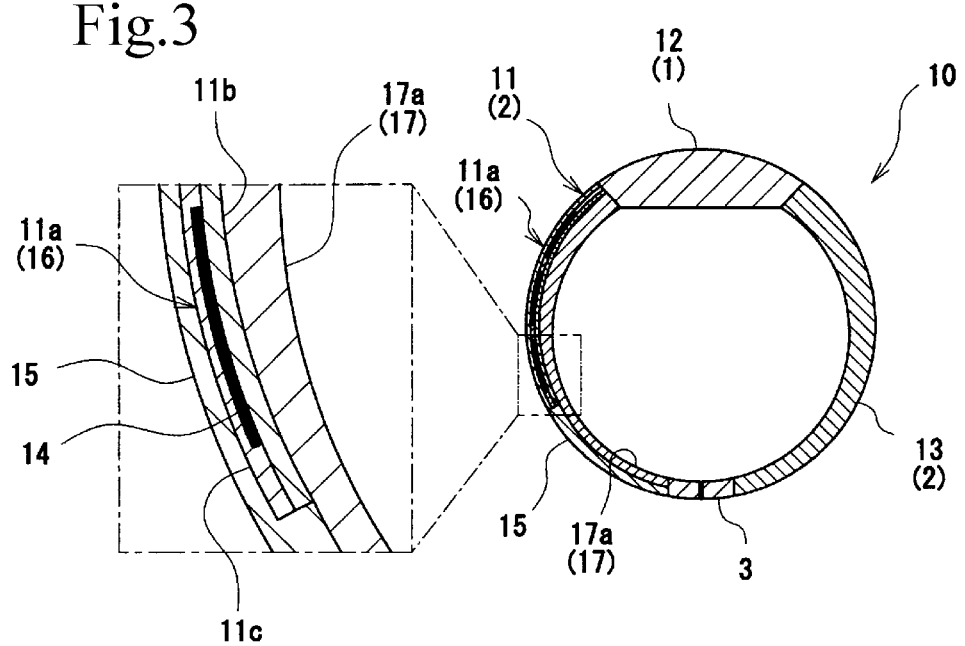
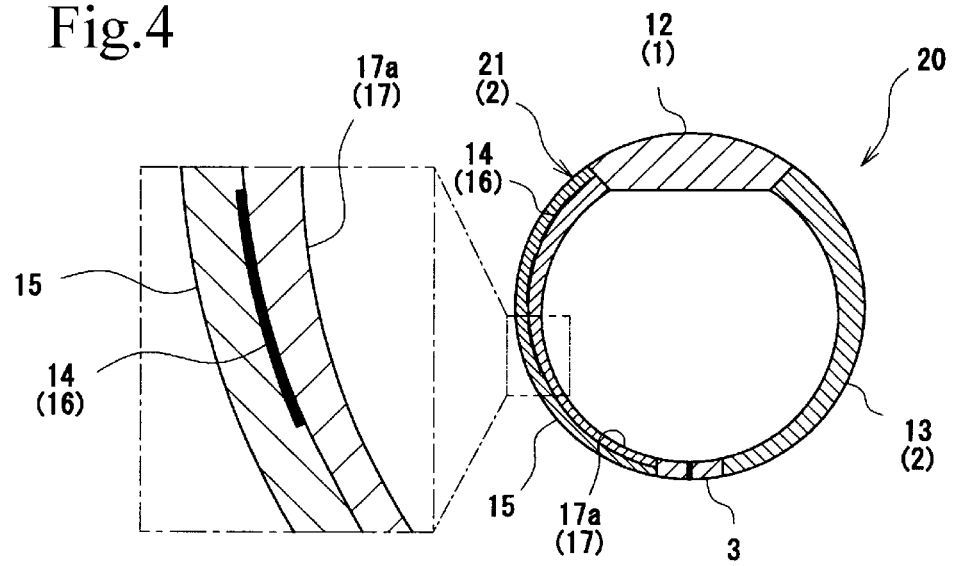

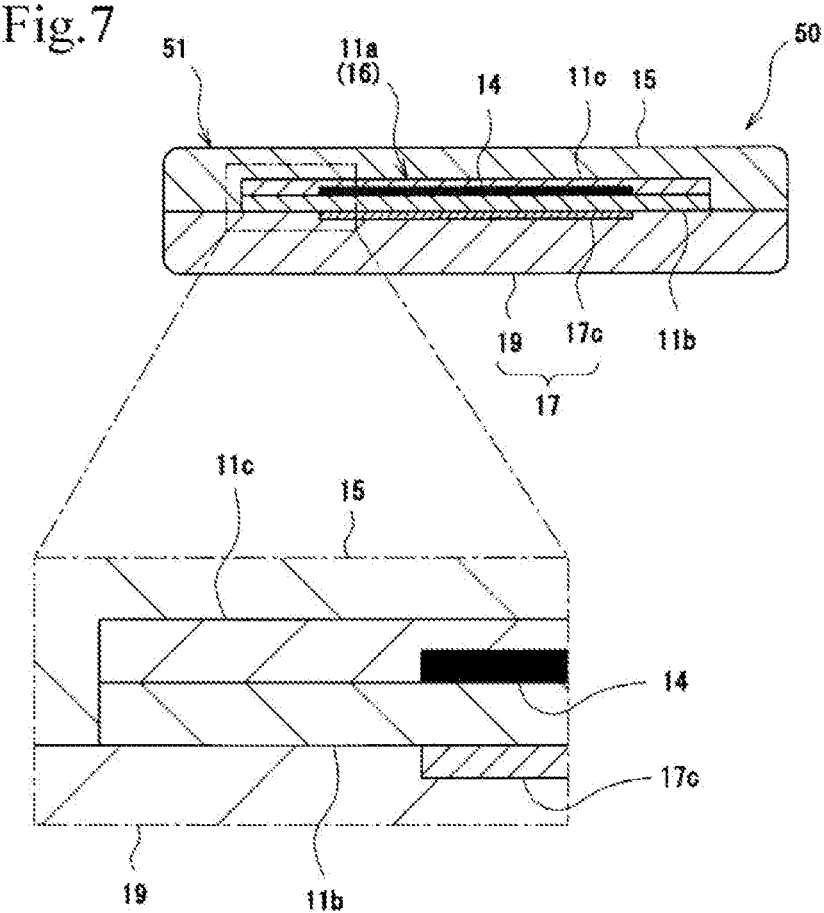
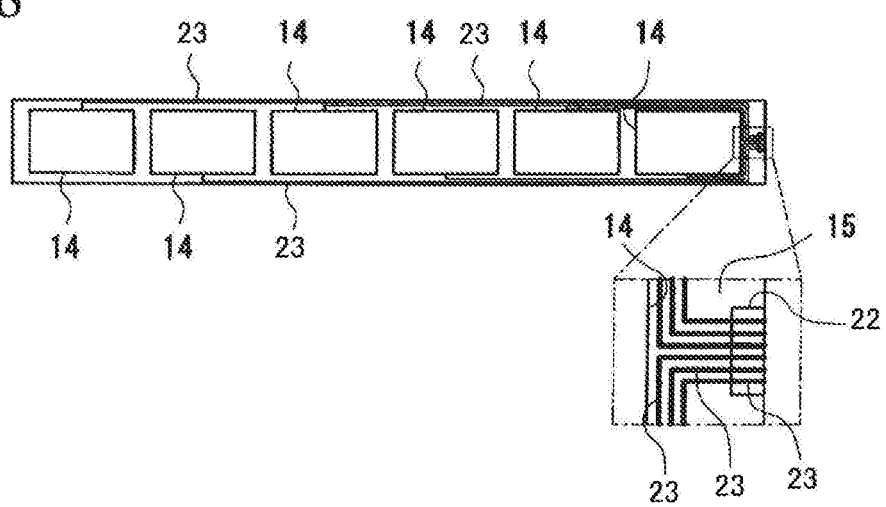

TOUCH SENSOR AND BRACELET-TYPE DEVICE

TECHNICAL FIELD

This application is a national phase entry under 35 U.S.C. § 371 of PCT Patent Application No. PCT/JP2015/062535, filed on Apr. 24, 2015, which claims priority under 35 U.S.C. § 119 to Japanese Patent Application No. 2014-092322, filed Apr. 28, 2014, both of which are incorporated by reference.

The present invention relates to a touch sensor, and particularly relates to a wearable touch sensor that can be used while being worn on part of a body and to a bracelet-type device using the wearable touch sensor.

BACKGROUND ART

In recent years, sophisticated devices that are used while being worn on a body have been developed. Examples of the sophisticated devices include lifelogging devices for recording the amount of daily exercise, and smart devices which are spectacle-type or wristwatch-type information devices. For example, Japanese Unexamined Patent Application Publication No. 2013-146557 (PTL 1) describes a wristwatch-type wearable device. Such a sophisticated device uses an input button and a touch sensor formed by metal members.

CITATION LIST

Patent Literature

PTL 1: Japanese Unexamined Patent Application Publication No. 2013-146557

SUMMARY OF INVENTION

Technical Problem

In a sophisticated device that is used while being worn on a body, the body touches the device on the back surface which is on the opposite side of an operation surface for operating a touch panel. Therefore, a touch sensor incorporated in the sophisticated device also detects a change in capacitance from the back surface. In particular, if the sophisticated device is thin, a change in capacitance resulting from contact and non-contact with the body on the back surface may cause a malfunction. Therefore, the sophisticated device designed to directly touch a skin has only a limited space for the sensor. The present invention has been made to solve this problem. An object of the present invention is to provide a touch sensor which does not easily detect a change in capacitance from the back surface thereof and is, in particular, less prone to malfunction even when used while being worn on a body, and also to provide a bracelet-type device using the touch sensor.

Solution to Problem

The following touch sensor is provided to achieve the object described above.

That is, the touch sensor includes a sensor electrode layer having a plurality of sensor electrodes, a front surface protective layer disposed on a side of an operation surface, and a back surface protective layer disposed on an opposite side of the operation surface, the front surface protective layer and the back surface protective layer being stacked together. In the touch sensor, the back surface protective layer includes a suppressing member configured to prevent easy detection of a change in capacitance from the opposite side of the operation surface.

The suppressing member configured to prevent easy detection of a change in capacitance is provided on the back side of the sensor electrode layer. Therefore, even if an operator touches the back surface of the touch sensor, the sensor electrodes do not easily detect a change in capacitance. Thus, for example, even in the case of a bracelet-type wearable sensor whose back surface is in and out of contact with an arm during use, a change in capacitance caused by presence or absence of contact of the arm is not easily detected, and hence the occurrence of malfunctions can be reduced. As described above, by using the touch sensor of the present invention in applications where a change in capacitance will occur not only on one surface but also on the other surface, the occurrence of malfunctions can be reduced.

In the touch sensor, the sensor electrode layer may be formed by a sensor sheet including a base film, the plurality of sensor electrodes formed on one surface of the base film, and a resist covering the sensor electrodes.

When the sensor electrode layer is formed by a sensor sheet including a base film, the plurality of sensor electrodes formed on one surface of the base film, and a resist covering the sensor electrodes, the manufacture can be simplified and the manufacturing process can be shortened by using a commercially available sensor sheet. Also, by using a terminal formed by a bundle of wires connected to the plurality of sensor electrodes, it is possible to easily make connection to a controller configured to process sensor signals. Since the sensor electrodes are protected by the base film and the resist, the touch sensor can be made resistant to external force, such as extension and contraction.

In the touch sensor, the suppressing member may include an insulating portion having a thickness at least three times a thickness of the front surface protective layer.

A change in capacitance is inversely proportional to thickness. Therefore, when the suppressing member includes an insulating portion having a thickness at least three times that of the front surface protective layer, if the front surface protective layer and the back surface protective layer are of the same material, a change in capacitance on the back surface can be made less than or equal to one-third that on the front surface. With this degree of difference, a signal from the front surface can be distinguished from that from the back surface. Thus, the signal from the back surface can be identified as noise, and the occurrence of malfunctions can be reduced.

In the touch sensor, the suppressing member may include an insulating portion having a permittivity lower than a permittivity of the front surface protective layer.

When the suppressing member includes an insulating portion having a permittivity lower than that of the front surface protective layer, it is possible to effectively make it difficult to detect a change in capacitance even when the thickness of the back surface protective layer is reduced. The touch sensor is thus suitably applicable to a thin device.

In the touch sensor, the suppressing member may include a conductive portion disposed to at least partly overlap the sensor electrodes in a direction perpendicular to the operation surface, and the conductive portion may be insulated from the sensor electrodes.

When the suppressing member includes a conductive portion disposed to at least partly overlap the sensor electrodes in a direction perpendicular to the operation surface, and then the conductive portion is insulated from the sensor electrodes, it is possible to block an electrostatic action between the outer surface of the back surface protective layer and the sensor electrodes, and to reduce the occurrence of malfunctions.

The conductive portion is preferably connected to a ground. By connecting the conductive portion to the ground, it is possible to keep the potential of the conductive portion constant, make a change in potential less likely to occur, and make it difficult to detect a change in capacitance on the side of the back surface protective layer.

The touch sensor described above can be used as a wearable touch sensor that touches part of an operator's body on the opposite side of the operation surface thereof, and can be provided as a wearable touch sensor or bracelet-type device including a controller configured to process sensor signals.

Advantageous Effects of Invention

A touch sensor according to the present invention is less prone to malfunction even when used while being worn on a body as a wearable touch sensor or bracelet-type device.

BRIEF DESCRIPTION OF DRAWINGS

FIG. 3 is a cross-sectional view obtained by cutting the bracelet-type device along its annular periphery into two rings.

FIG. 4 is a cross-sectional view corresponding to FIG. 3 and illustrating a bracelet-type device including a wearable touch sensor according to a second embodiment.

FIG. 7 is a cross-sectional view corresponding to FIG. 2 and illustrating a bracelet-type device including a wearable touch sensor according to a fifth embodiment.

FIG. 8 is a plan view of sample 1.

DESCRIPTION OF EMBODIMENTS

Figure 1:
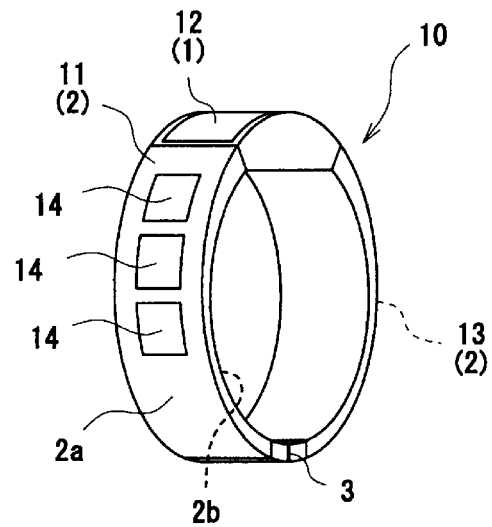
FIG. 1 is a perspective view of a bracelet-type device including a wearable touch sensor according to a first embodiment.

Further details will be described in the following embodiments. Note that components common to the embodiments are denoted by the same reference numerals and redundant description will be omitted. Redundant description of common materials, operations, and advantageous effects will also be omitted.

First Embodiment

Figure 2:
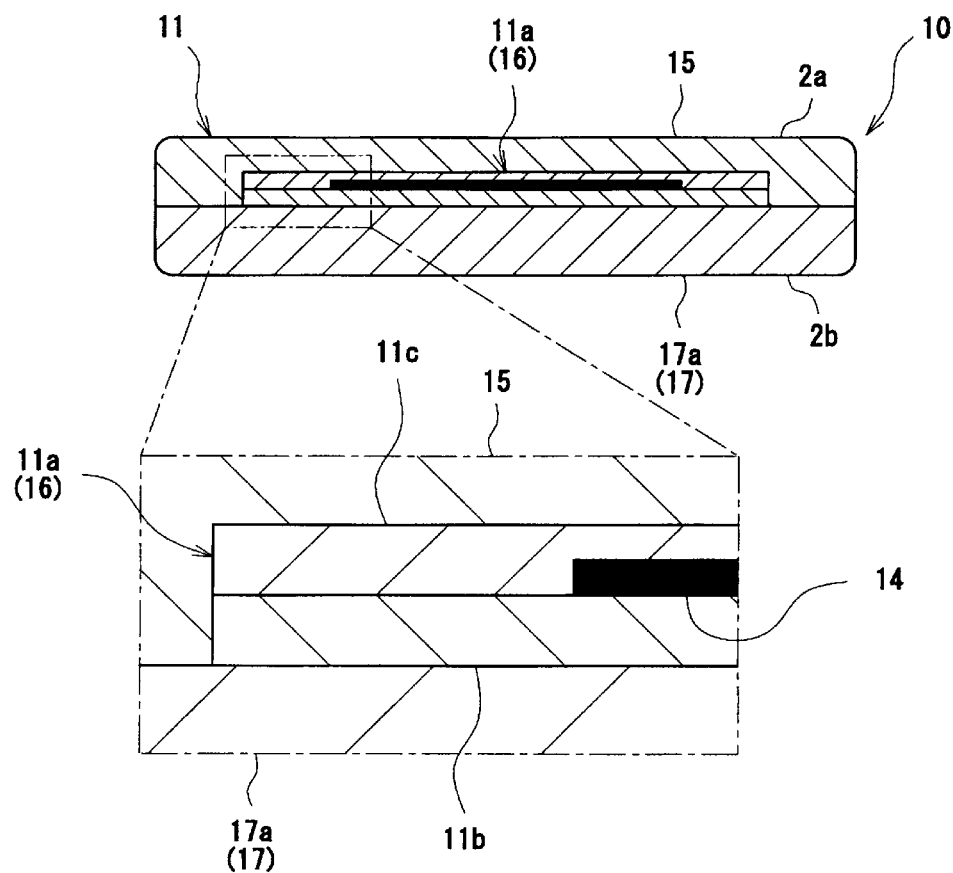
FIG. 2 is a cross-sectional view obtained by cutting open the bracelet-type device of FIG. 1 on one of sensor electrodes into a band shape.

FIGS. 1 to 3

FIG. 1 is a perspective view of a bracelet-type device 10 according to the present embodiment. Externally, the device 10 has a display 1 configured to provide various indications and an annular belt 2, and is shaped to be attached to and removed from an arm by opening and closing a joint 3. Functionally, the device 10 includes a touch sensor applied as a wearable touch sensor 11, a controller 12 (corresponding to the display 1) electrically connected to sensor electrodes 14 of the wearable touch sensor 11 to process sensor signals, and a band portion 13 and the joint 3 which form the other part.

The wearable touch sensor 11 forms one part of the belt 2 in the present embodiment, and is coupled at one end thereof to the controller 12 and coupled at the other end thereof to the joint 3. The device 10 has a front surface 2a serving as an operation surface for an input operation, and a back surface 2b on the opposite side of the front surface 2a. When an operator touches the operation surface, the sensor electrodes 14 detect the resulting change in capacitance. Then, the output from the sensor electrodes 14 is input to the controller 12.

FIG. 2 is a cross-sectional view obtained by cutting open the annular device 10 on one of the sensor electrodes 14 into a band shape. The wearable touch sensor 11 is formed by stacking a front surface protective layer 15, a sensor electrode layer 16, and a back surface protective layer 17 in this order from the front surface 2a of the device 10.

In the present embodiment, the sensor electrode layer 16 is formed by a sensor sheet 11a having the plurality of sensor electrodes 14. The sensor sheet 11a is a laminated sheet member formed by placing the plurality of conductive sensor electrodes 14 and wires (not shown) on a base film 11b and covering them with a resist 11c. Using the sensor sheet 11a makes it easy to form an end portion and wires connected to the controller 12.

The base film 11b is preferably formed by a thermoplastic resin film. This is because thermoplastic resin can be easily molded when heated. Examples of the thermoplastic resin include polyethylene terephthalate (PET) resin, polyethylene naphthalate (PEN) resin, polycarbonate (PC) resin, polymethyl methacrylate (PMMA) resin, polypropylene (PP) resin, polyurethane (PU) resin, polyamide (PA) resin, polyethersulfone (PES) resin, polyether ether ketone (PEEK) resin, triacetyl cellulose (TAC) resin, polyimide (PI) resin, and cycloolefin polymer (COP).

In the case of providing a decorative layer (not shown) between the front surface protective layer 15 and the back surface protective layer 17, a transparent resin film is preferably used as the base film 11b, because the sensor sheet 11a is required to be transparent.

The thickness of the base film 11b is not particularly limited, but preferably ranges from 10 μm to 200 μm.

The base film 11b may be provided with a primer layer for enhanced adhesion to a conductive polymer, a surface protective layer, or an overcoat layer for antistatic purposes, and then surface-treated.

The sensor electrodes 14 include a conductive ink or conductive polymer. By using the conductive polymer, the sensor electrodes 14 having high transparency and less prone to lose conductivity due to extension and contraction can be obtained. Using the conductive polymer is also preferable in that since the sensor electrodes 14 can be printed by applying the conductive polymer in a liquid form, the sensor electrodes 14 can be obtained at a lower cost than using ITO or the like. If transparency is not required, the sensor electrodes 14 may be formed by a conductive ink, such as silver ink or carbon paste. Using the silver ink is preferable in that the sensor electrodes 14 with low resistance and high sensitivity can be obtained. On the other hand, using the carbon paste is preferable in that the sensor electrodes 14 can be obtained at a lower cost than using the conductive polymer, and that the carbon paste is resistant to weather.

Examples of the transparent conductive polymer that can be used to form the sensor electrodes 14 include polyparaphenylene, polyacethylene, and poly-3,4-ethylenedioxythiophene-polystyrene sulfonate (PEDOT-PSS).

The layer thickness of the sensor electrodes 14 preferably ranges from 0.04 µm to 1.0 µm, and more preferably ranges from 0.06 µm to 0.4 µm. If the layer thickness is less than 0.04 µm, the resistance value of the sensor electrodes 14 may increase, whereas if the layer thickness exceeds 1.0 µm, the transparency of the sensor electrodes 14 may decrease.

The layer thickness of the sensor electrodes 14 may be measured by measuring the sensor electrodes 14 formed on the base film 11b using an atomic force microscope (AFM).

The wires are conductive lines for electrically connecting the controller 12 to the sensor electrodes 14. The wires are preferably formed of a conductive paste or conductive ink containing a high-conductivity metal, such as copper, aluminum, silver, or alloys of these metals. Silver wires are most preferable, because silver has the highest conductivity among these metals and alloys and is more resistant to oxidation than copper.

The thickness of the wires preferably ranges from 1.0 µm to 20 µm. If the thickness is less than 1.0 µm, the resistance value of the wires tends to increase and this may cause noise. On the other hand, if the thickness exceeds 20 µm, the resulting increase in level difference may cause formation of air bubbles during application of the resist 11c.

The resist 11c is an insulating coating provided for prevention of electrical connection between the sensor electrodes 14, and also for protection of the sensor electrodes 14 from ultraviolet light and scratches. The resist 11c is also suitable for preventing sulfidation of the wires formed of silver paste or metal.

A hard resin is selected to form the resist 11c. For example, an acrylic resin, a urethane resin, an epoxy resin, a polyolefin resin, or other resins may be used. When transparency is required, a transparent resin is used.

The thickness of the resist 11c typically ranges from 6 µm to 30 µm, and preferably ranges from 10 µm to 20 µm. This is because if the thickness exceeds 30 µm, the resist 11c is less flexible, whereas if the thickness is less than 6 µm, the resist 11c may not be able to fully protect the sensor electrodes 14.

The front surface protective layer 15 is disposed on an operation surface side of the sensor electrode layer 16, which is the sensor sheet 11a, to protect the sensor electrode layer 16. A hard resin or elastomer may be used to form the front surface protective layer 15. For better wearability and feel of the device 10, it is preferable to use a flexible elastomer. Examples of the flexible elastomer include thermosetting rubber and thermoplastic elastomer.

A high-permittivity material is preferably used to form the front surface protective layer 15. By using a fluorocarbon resin having a relatively high permittivity, such as polyurethane resin or polyvinylidene fluoride, or adding a filler for permittivity enhancement, such as barium titanate or titanium oxide, the permittivity of the front surface protective layer 15 can be enhanced.

The thickness of the front surface protective layer 15 is preferably thinner, as long as a desired protective effect of protecting the sensor electrode layer 16 can be achieved. This is because the thinner the thickness, the higher the sensor sensitivity. The front surface protective layer 15 is preferably thinner than the back surface protective layer 17. This is to increase a change in capacitance produced when the operator touches the operation surface, and thus to reduce the occurrence of malfunctions.

The front or back surface of the front surface protective layer 15 may be provided with a decorative layer for creating patterns or designs. In the case of providing a decorative layer on the back surface of the front surface protective layer 15, the front surface protective layer 15 needs to be formed of a transparent resin.

The back surface protective layer 17 of the present embodiment is formed as an insulating portion having a lower permittivity than the front surface protective layer 15 and serving itself as a suppressing member 17a. The suppressing member 17a is provided so that a change in capacitance caused by contact and non-contact with the arm on the back surface 2b is not easily transmitted to the sensor electrodes 14.

The permittivity of the back surface protective layer 17 serving as the suppressing member 17a can be reduced, for example, by using a low-permittivity material to form the back surface protective layer 17, or by forming an air layer. More specifically, the permittivity of the back surface protective layer 17 can be reduced by using a fluorocarbon resin, such as a silicone material or polytetrafluoroethylene, or a foam having a relatively low permittivity, or by forming an air layer by producing protrusions on the surface.

The thickness of the back surface protective layer 17 serving as the suppressing member 17a is set to achieve a desired protective effect. The back surface protective layer 17 is preferably thicker than the front surface protective layer 15. This is because if a change in capacitance produced when the operator touches the back surface protective layer 17 is smaller than a change in capacitance produced when the operator touches the operation surface, a surface touched by the operator can be identified by setting a predetermined threshold. In particular, if there is only a small difference in permittivity between materials forming the front surface protective layer 15 and the back surface protective layer 17, creating a difference in thickness can reduce the occurrence of malfunctions.

In the description above, the base film 11b and the resist 11c of the sensor sheet 11a are positioned to be in contact with the back surface protective layer 17 and the front surface protective layer 15, respectively, and stacked together. Although the front and back sides of the sensor sheet 11a may be reversed within the wearable touch sensor 11, it is preferable that the front surface protective layer 15 be adjacent to the resist 11c. This is because since the resist 11c is typically thinner than the base film 11b, the distance between the sensor electrodes 14 and the operation surface can be made shorter than that in the case where the front surface protective layer 15 is adjacent to the base film 11b.

The wearable touch sensor 11 can be manufactured, for example, by molding the sensor sheet 11a integrally with the front surface protective layer 15 and the back surface protective layer 17 through insert molding, by stacking the back surface protective layer 17 and the sensor sheet 11a and applying a liquid resin onto them to form the front surface protective layer 15, or by securing the premolded front surface protective layer 15 and back surface protective layer 17 to each other with the sensor sheet 11a sandwiched therebetween.

The wearable touch sensor 11 and the controller 12 are formed as separate members and secured to each other by electrically connecting the wires extending from the sensor electrodes 14 to predetermined portions of the controller 12.

The controller 12 has the function of processing the output of the wearable touch sensor 11, displaying information as necessary, and inputting and outputting signals from and to an external device. The controller 12 has a display panel, which serves as the display 1 that displays various types of information.

FIG. 3 is a cross-sectional view obtained by cutting the ring-shaped device 10 along its periphery into two parts. As illustrated in this cross-sectional view, the left-hand side of the belt 2 is the wearable touch sensor 11 and the right-hand side of the belt 2 is the band portion 13 formed of a soft plastic or rubber material or of a leather. The controller 12 having the display 1 is on the upper side of the drawing, and the joint 3 is on the lower side of the drawing.

To use the wearable touch sensor 11 and the device 10 including the wearable touch sensor 11, the operator releases the joint 3 and wraps the belt 2 around an arm. When the operator touches the front surface 2a adjacent to the sensor electrodes 14 with a finger, the controller 12 electrically connected to the sensor electrodes 14 detects a change in capacitance and performs necessary processing. The result may be displayed on the display 1. If the device 10 is worn around the arm with a space therebetween, the wearable touch sensor 11 is repeatedly brought into and out of contact with the arm. Since the suppressing member 17a prevents the resulting change in capacitance from being easily transmitted to the sensor electrodes 14, this contact and non-contact is less likely to cause malfunctions.

Modification

The front surface protective layer 15 and the back surface protective layer 17 may be formed of the same material. In this case, the thickness of the back surface protective layer 17 is preferably at least three times that of the front surface protective layer. A change in capacitance caused by an operator's touch is inversely proportional to thickness. Therefore, if the thickness of the sealing member 17a is at least three times the thickness of the front surface protective layer 15, the change in capacitance can be reduced in proportion to the difference in thickness. If the change in capacitance is about three times or more, a signal from the operation surface can be distinguished from that from the back surface. It is thus possible to distinguish signal from noise and reduce malfunctions.

In the case of using a difference in permittivity between the front surface protective layer 15 and the back surface protective layer 17, the front surface protective layer 15 and the back surface protective layer 17 can be easily formed of different materials. However, even when the front surface protective layer 15 and the back surface protective layer 17 are formed of the same material, adjustment can be made by varying their thicknesses.

Second Embodiment

FIG. 4

FIG. 4 illustrates a bracelet-type device 20 according to another embodiment. The bracelet-type device 20 differs in the configuration of a wearable touch sensor 21. Instead of the sensor sheet 11a, a single layer formed only of the sensor electrodes 14 serves as the sensor electrode layer 16.

The wearable touch sensor 21 can be manufactured by printing the sensor electrodes 14 on the back surface protective layer 17 and stacking the front surface protective layer 15 on the back surface protective layer 17.

With this configuration, it is still possible to provide the device 20 which is less prone to malfunction even if the back surface 2b is brought into and out of contact with a body.

Third Embodiment

FIG. 5

Figure 5:
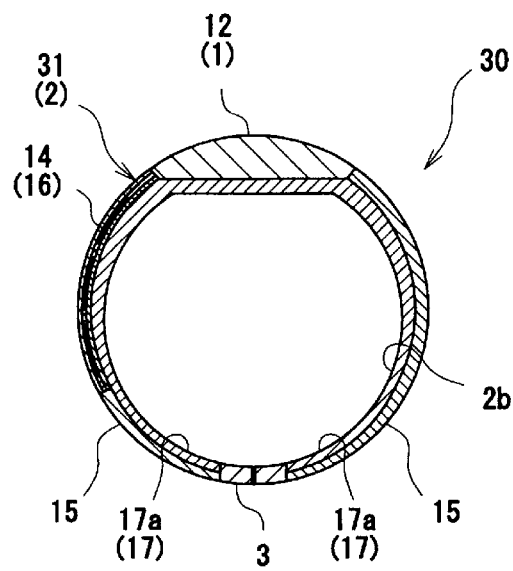
FIG. 5 is a cross-sectional view corresponding to FIG. 3 and illustrating a bracelet-type device including a wearable touch sensor according to a third embodiment.

FIG. 5 illustrates a bracelet-type device 30 according to still another embodiment. The bracelet-type device 30 differs in a wearable touch sensor 31.

More specifically, the entire belt 2 serves as the wearable touch sensor 31, and the right-hand side of the belt 2 in FIG. 5 also includes the back surface protective layer 17 and the front surface protective layer 15 stacked together to form the wearable touch sensor 31. Additionally, the controller 12 is integrally secured onto the back surface protective layer 17.

With this configuration, it is still possible to provide the device 30 which is less prone to malfunction even if the back surface 2b is brought into and out of contact with a body.

Fourth Embodiment

FIG. 6

Figure 6:
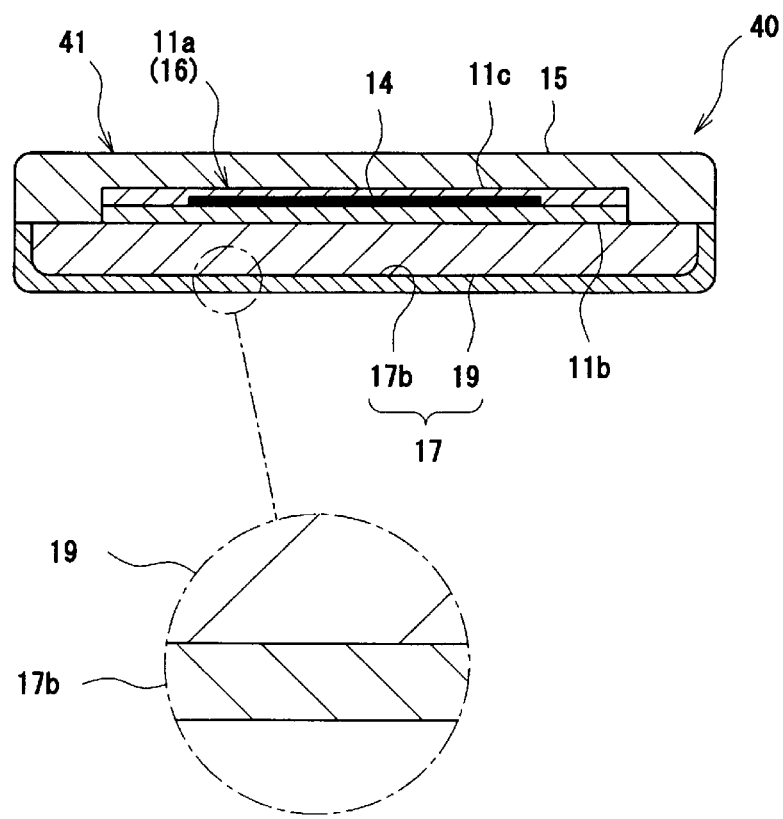
FIG. 6 is a cross-sectional view corresponding to FIG. 2 and illustrating a bracelet-type device including a wearable touch sensor according to a fourth embodiment.

FIG. 6 is a cross-sectional view corresponding to FIG. 2 and illustrating a bracelet-type device 40 according to still another embodiment. The bracelet-type device 40 differs from the above-described embodiments in that the back surface protective layer 17 of a wearable touch sensor 41 includes a conductive suppressing member 17b.

The back surface protective layer 17 includes the conductive suppressing member 17b together with an insulating portion 19. The conductive suppressing member 17b may be formed of a metal material (e.g., copper, aluminum, or stainless steel), a conductive resin obtained by dispersing silver powder or copper powder in a resin, or a conductive polymer. In FIG. 6, the suppressing member 17b is disposed as the outermost layer to serve as an outer coating.

The suppressing member 17b is formed to cover at least part of the sensor electrodes 14 in a direction perpendicular to the front surface 2a of the device 40. The suppressing member 17b preferably fully covers the sensor electrodes 14. In the configuration illustrated in FIG. 6, the sensor electrodes 14 are entirely covered. When the sensor electrodes 14 are covered, even if an operator touches the back surface 2b of the device 40, the resulting change in capacitance cannot be easily detected by the sensor electrodes 14.

Fifth Embodiment

FIG. 7

FIG. 7 is a cross-sectional view corresponding to FIG. 2 and illustrating a bracelet-type device 50 according to still another embodiment. In this bracelet-type device 50, the back surface protective layer 17 of a wearable touch sensor 51 also includes a conductive suppressing member 17c, but the arrangement is different from the previous embodiment.

The back surface protective layer 17 includes the conductive suppressing member 17c separately from the insulating portion 19. The suppressing member 17c is secured to the back surface of the base film 11b. Again, the sensor electrodes 14 are covered by the suppressing member 17c. Therefore, even if an operator touches the back surface protective layer 17, the resulting change in capacitance cannot be detected by the sensor electrodes 14.

If the sensor electrode layer 16 is formed only by the sensor electrodes 14, the suppressing member 17c needs to be insulated from the sensor electrodes 14. In this case, the suppressing member 17c can be embedded in the back surface protective layer 17, that is, in the insulating portion 19.

Aside from being electrically isolated (floated) in the back surface protective layer 17, the conductive suppressing member 17c may be connected to a ground (GND) of the controller 12. With this configuration, even if the operator touches the back surface 2b of the device 50, the potential of the suppressing member 17c can be kept constant. Therefore, detection of the resulting change in capacitance from the back surface 2b can be more effectively prevented.

The embodiments described above are merely examples of the present invention and are not limited thereto. The shapes, materials, and manufacturing methods of the components may be changed or replaced within the scope of the present invention.

For example, the back surface protective layer 17 may be a thick film formed of a low-permittivity material, and the suppressing members 17a to 17c may each be applied to a different embodiment. The sensor electrode layer 16 formed by the sensor sheet 11a may be replaced with a single layer of the sensor electrodes 14, and the reverse is also possible.

Additionally, although the controller 12 has the display 1 in the embodiments described above, the controller 12 may not have the display 1, and may be configured such that data processed by the controller 12 can be displayed on a PC.

Although the touch sensor is applied as the wearable touch sensors 11 to 51 to the bracelet-type devices 10 to 50 in the examples described above, the devices are not limited to the devices 10 to 50. That is, the touch sensor is applicable to any types of devices having an operation surface on one side and touching an operator on the other side, such as spectacle-type devices, glove-type devices, and input devices worn on part of clothing.

In the description above, the surface for touch operation with fingers is referred to as "front surface", and the surface in contact with an arm or the like is referred to as "back surface". However, if the touch sensor is used to detect contact with an arm or the like, the surface in contact with the arm or the like may be referred to as "front surface", and the surface on the opposite side may be referred to as "back surface".

The back surface may have a portion with no suppressing member so that the sensor electrode layer in this portion can detect a change in capacitance on the back surface.

EXAMPLES

Further details will be described on the basis of the following experimental examples. Various samples (described below), each simulating a wearable touch sensor, were prepared. Then the impact of an operator's contact with the back surface of each sample was evaluated.

1. Preparation of Each Sample
   <Sample 1>
   Sample 1 simulating a wearable touch sensor was prepared. FIG. 8 is a plan view of sample 1.

First, a sensor sheet (sensor electrode layer) (11a) was prepared by stacking sensor electrodes (14) and a resist (11c) on one surface of a band-like polyethylene terephthalate film (base film (11b)) measuring 100 μm thick. More specifically, six conductive portions serving as the sensor electrodes (14), each measuring 15 mm wide by 25 mm long, were formed using a transparent conductive ink on the surface of the base film (11b) measuring 20 mm wide by 180 mm long, wires (23) extending from each of the sensor electrodes (14) to one end of the base film (11b) were formed, and the resist (11c) was formed on the wires (23) using a transparent polyurethane resin ink. The wires were not covered by the resist (11c) at the one end, and a carbon ink was applied thereto to form a terminal (22). The sensor electrodes (14), the wires (23), the resist (11c), and the terminal (22) were all formed by screen printing.

Then a front surface protective layer (15) formed by a 1-mm-thick silicone rubber layer was provided on the surface of the sensor sheet (11a) on the side of the resist (11c) with the terminal (22) exposed, and a back surface protective layer (17) formed by a 1-mm-thick silicone rubber layer was provided on the surface of the sensor sheet (11a) on the base film side. Sample 1 simulating a wearable touch sensor was thus prepared.

<Sample 2>
Sample 2 was prepared in the same manner as sample 1, except that the back surface protective layer was a 1-mm-thick silicone foam layer.

<Sample 3>
Sample 3 was prepared in the same manner as sample 1, except that the back surface protective layer was a 3-mm-thick silicone rubber layer.

<Sample 4>
Sample 4 was prepared in the same manner as sample 1, except that the back surface protective layer was composed of an insulating portion formed by a 1-mm-thick silicone rubber layer and a suppressing member formed by a 12-μm-thick layer of aluminum foil on the outside surface of the insulating portion.

<Sample 5>
Sample 5 was prepared in the same manner as sample 4, except that the suppressing member (aluminum foil) in sample 4 was connected to the ground (earth) of a measuring device.

<Sample 6>
Sample 6 was prepared in the same manner as sample 1, except that the back surface protective layer was composed of a suppressing member formed by a 12-μm-thick layer of aluminum foil stacked on the back surface of the sensor sheet, and an insulating portion formed by a 1-mm-thick silicone rubber layer provided to cover the suppressing member. In sample 6, the sensor electrodes and the suppressing member were insulated from each other by a polyethylene terephthalate film therebetween.

<Sample 7>
Sample 7 was prepared in the same manner as sample 6, except that the suppressing member (aluminum foil) in sample 6 was connected to the ground (earth) of the measuring device.

2. Sensitivity Test
For each sample, the wires connected to the sensor electrodes were connected to a PSoC IC (microcontroller CY8C24894, manufactured by Cypress Semiconductor Corporation) to measure the sensitivity (Diff). As parameters of the PSoC IC, Resolution was set to 13 bits (8192), Ref value was set to 4, and Rb resistance was set to 3.3 KΩ.

Sensitivity test 1: Each sample was placed on an insulating sample stage, and a change in sensitivity caused by a finger touch on the front surface (i.e., on the front surface protective layer side; the same applies hereinafter) was measured. The measured value was denoted as S1.

Sensitivity test 2: Each sample was attached to an arm such that the back surface was in contact with the bare skin, and a change in sensitivity before and after the attachment was measured. The measured value was defined as noise (N).

Sensitivity test 3: For each sample attached to the arm in sensitivity test 2, a change in sensitivity caused by a finger touch on the front surface was measured. The measured value was denoted as S2.

S/N ratio: An S/N ratio was calculated using a change in sensitivity caused by a finger touch on the front surface as a signal (S1, S2) and using a change in sensitivity caused by contact of the back surface with the arm as noise (N).

The results are shown in Table 1.

TABLE 1

| Sample No. | Configuration | Sensitivity (DIFF) | | | S/N Ratio | |
|---|---|---|---|---|---|---|
| | | Sensitivity Test 1 (S1) | Sensitivity Test 2 (N) | Sensitivity Test 3 (S2) | S1/N Ratio | S2/N Ratio |
| Sample 1 | — | 205 | 256 | 190 | 0.8 | 0.74 |
| Sample 2 | Equivalent to FIG. 2 | 196 | 143 | 179 | 1.37 | 1.25 |
| Sample 3 | Equivalent to FIG. 2 | 200 | 92 | 185 | 2.17 | 2.01 |
| Sample 4 | Equivalent to FIG. 6 | 200 | 129 | 207 | 1.55 | 1.6 |
| Sample 5 | Equivalent to FIG. 6 | 200 | 79 | 214 | 2.53 | 2.71 |
| Sample 6 | Equivalent to FIG. 7 | 200 | 158 | 267 | 1.27 | 1.69 |
| Sample 7 | Equivalent to FIG. 7 | 200 | 82 | 205 | 2.44 | 2.5 |

The present tests are intended to evaluate whether an input operation from the front surface of the wearable touch sensor is possible, regardless of whether there is contact of an arm with the back surface. Therefore, when a change in sensitivity caused by contact of an arm with the back surface is considered as noise, if the value of an input operation S1 performed when an arm is not in contact with the back surface and the value of an input operation S2 performed when an arm is in contact with the back surface are both greater than the noise value, it is possible to distinguish signals from noise.

For sample 1, both the S1/N ratio and the S2/N ratio were less than 1.0. That is, signals could not be distinguished from noise, which was greater than the signals. As for samples 2 to 7, both the S1/N ratio and the S2/N ratio exceeded 1, and signals could be distinguished from noise.

Particularly in sample 3 where the thickness of the back surface protective layer was three times the thickness of the front surface protective layer, both the S1/N ratio and the S2/N ratio exceeded 2. This showed that if the back surface protective layer and the front surface protective layer are of the same material or materials with similar dielectric characteristics, the thickness of the back surface protective layer is preferably at least three times that of the front surface protective layer. At the same time, a comparison between sample 2 and sample 1 showed that even when the front surface protective layer and the back surface protective layer have the same thickness, the impact of contact of an arm with the back surface can be reduced by using a low-permittivity material, such as a foam material. Additionally, a comparison between sample 4 and sample 5 and a comparison between sample 6 and sample 7 showed that in the case of providing a conductive suppressing member, both the S1/N ratio and the S2/N ratio can be significantly improved by connecting the suppressing member to the ground. In sample 5 and sample 7, both the S1/N ratio and the S2/N ratio were particularly large. This showed that the wearable touch sensor is preferably configured such that the suppressing member is connected to the ground.

REFERENCE SIGNS LIST

1: display
2: belt
  2a: front surface
  2b: back surface
3: joint
10, 20, 30, 40, 50: bracelet-type device
11, 21, 31, 41, 51: wearable touch sensor (touch sensor)
  11a: sensor sheet
  11b: base film
  11c: resist
12: controller
13: band portion
14: sensor electrode
15: front surface protective layer
16: sensor electrode layer
17: back surface protective layer
  17a, 17b, 17c: suppressing member
19: insulating portion
20: bracelet type device
21: wearable touch sensor
22: terminal
23: wire

The invention claimed is:

1. A touch sensor comprising:
a sensor electrode layer having a plurality of sensor electrodes;
a front surface layer disposed on a side of a front surface; and
a back surface layer disposed on a back surface which is an opposite surface of the front surface,
wherein the front surface layer, a sensor electrode layer, and the back surface layer being stacked together in this order from the front surface,
wherein the back surface layer includes a suppressing member which is disposed on the back surface opposite from the front surface, and is exposed outside so as to be touched by a wearer's body, and is configured to prevent detecting a capacitance change from the back surface, and
wherein the sensor electrodes is located only in a same plane between the front surface layer and the back surface layer configured to detect input operation only through the front surface layer.

2. The touch sensor according to claim 1, wherein the sensor electrode layer is formed by a sensor sheet, wherein the sensor sheet includes a base film, the plurality of sensor electrodes formed on one surface of the base film, and a resist covering the sensor electrodes.

3. The touch sensor according to claim 1, wherein the suppressing member includes an insulating portion having a thickness at least three times a thickness of the front surface layer.

4. The touch sensor according to claim 1, wherein the suppressing member includes an insulating portion having a permittivity lower than a permittivity of the front surface layer.

5. The touch sensor according to claim 1, wherein the suppressing member includes a conductive portion disposed to at least partly overlap the sensor electrodes in a direction perpendicular to the front surface, and the conductive portion is insulated from the sensor electrodes.

6. The touch sensor according to claim 5, wherein the conductive portion is connected to a ground.

7. The touch sensor according to claim 1, wherein the touch sensor is a wearable touch sensor touched by the part of the wearer's body on the back surface.

8. A bracelet device comprising the touch sensor according to claim 1, and a controller electrically connected to the sensor electrodes to process sensor signals.

9. The touch sensor according to claim 1, wherein the touch sensor excludes other sensor electrodes than the sensor electrodes in the sensor electrode layer.

* * * * *